United States Patent
Ybarra et al.

(10) Patent No.: US 10,259,431 B1
(45) Date of Patent: Apr. 16, 2019

(54) SELF-CENTERING WIPER SYSTEM FOR AN OPTICAL DEVICE

(71) Applicant: GM GLOBAL TECHNOLOGY OPERATIONS LLC, Detroit, MI (US)

(72) Inventors: Armand J. Ybarra, Rochester Hills, MI (US); Joel S. Hooton, Chesterfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/846,743

(22) Filed: Dec. 19, 2017

(51) Int. Cl.
*B08B 1/00* (2006.01)
*B08B 3/02* (2006.01)
*B60Q 1/00* (2006.01)
*B60S 1/08* (2006.01)
*B60S 1/10* (2006.01)
*B60S 1/12* (2006.01)
*B60S 1/44* (2006.01)
(Continued)

(52) U.S. Cl.
CPC ............... *B60S 1/66* (2013.01); *B08B 1/005* (2013.01); *B08B 1/006* (2013.01); *B08B 3/02* (2013.01); *B60Q 1/00* (2013.01); *B60S 1/0848* (2013.01); *B60S 1/10* (2013.01); *B60S 1/12* (2013.01); *B60S 1/44* (2013.01); *B60S 1/566* (2013.01); *B08B 1/008* (2013.01); *B08B 9/023* (2013.01); *B60S 1/52* (2013.01); *B60S 1/524* (2013.01); *G01S 17/10* (2013.01); *G01S 17/936* (2013.01); *G02B 27/0006* (2013.01); *H04N 1/00909* (2013.01)

(58) Field of Classification Search
CPC .. B60S 1/02; B60S 1/04; B60S 1/0848; B60S 1/10; B60S 1/12; B60S 1/66; B60S 1/56; B60S 1/566; B60S 1/44; B60S 1/46; B60S 1/52; B60S 1/522; B60S 1/524; B08B 1/002; B08B 1/006; B08B 5/02; B08B 1/008; B08B 9/023; B08B 9/0808; B08B 9/087; B08B 7/04; B08B 7/0071; H04N 5/2171; H04N 7/183; H04N 1/00909; G02B 27/0006; B60Q 1/00; B60Q 1/0005

USPC .......... 15/250.29, 250.003, 250.002, 104.04, 15/97.1, 101, 246.5

See application file for complete search history.

(56) References Cited

U.S. PATENT DOCUMENTS 3,613,148 A * 10/1971 Meissner et al. ......... B60S 1/60
15/250.29
5,274,243 A * 12/1993 Hochgraf ................ F21V 13/04
250/559.41

(Continued)

*Primary Examiner* — Gary K. Graham
(74) *Attorney, Agent, or Firm* — Quinn IP Law

(57) ABSTRACT

A self-centering wiper system for an optical device having an optical device body defined by an outer surface with an annular-shaped cross-section disposed along an axis includes an annular-shaped bellows. The bellows is configured to fit externally and concentrically with respect to the outer surface of the optical device body. The bellows has at least one bladder configured to accept a pressurized fluid to thereby extend the annular-shaped bellows along the axis. The wiper system also includes an annular-shaped wiper element fixed to the annular-shaped bellows and configured to wipe contaminants off the outer surface of the optical device body as the at least one bladder accepts the pressurized fluid and the annular-shaped bellows expands along the axis. An optical device having such a self-centering wiper system is also disclosed.

20 Claims, 7 Drawing Sheets

(51) Int. Cl.
*B60S 1/52* (2006.01)
*B60S 1/56* (2006.01)
*B60S 1/66* (2006.01)
*H04N 1/00* (2006.01)
*B08B 9/023* (2006.01)
*G01S 17/10* (2006.01)
*G01S 17/93* (2006.01)
*G02B 27/00* (2006.01)

(56) References Cited

U.S. PATENT DOCUMENTS

2007/0094831 A1* 5/2007 Huguley ............... B60S 1/3801
　　　　　　　　　　　　　　　　　　　　　　15/250.4
2013/0104933 A1* 5/2013 Aldred ............... G02B 27/0006
　　　　　　　　　　　　　　　　　　　　　　134/6

* cited by examiner

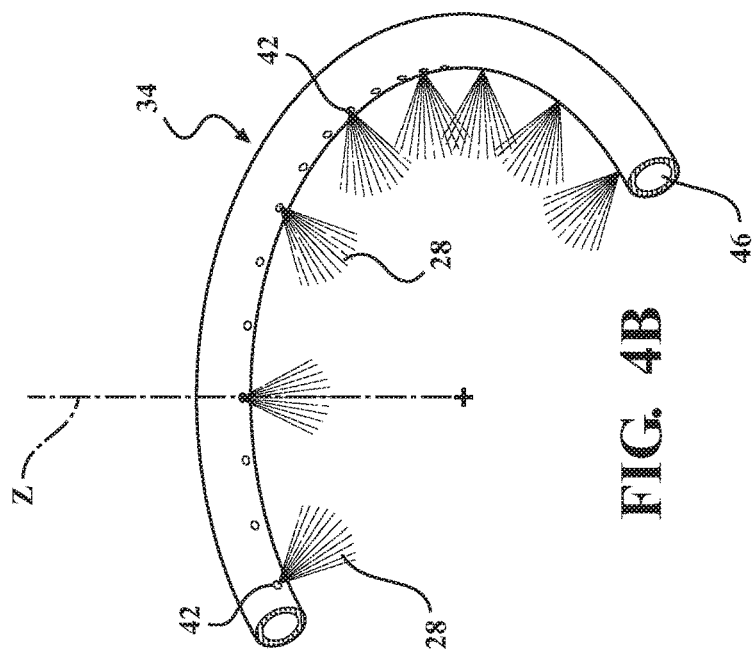
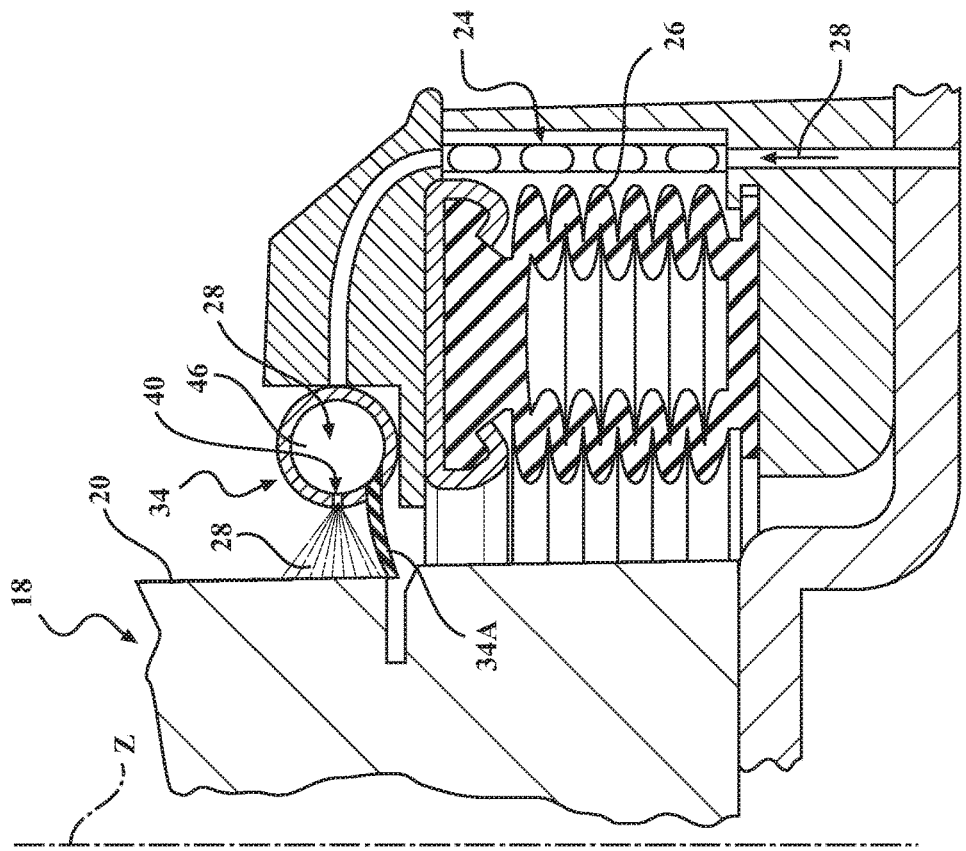
FIG. 4B
FIG. 4A

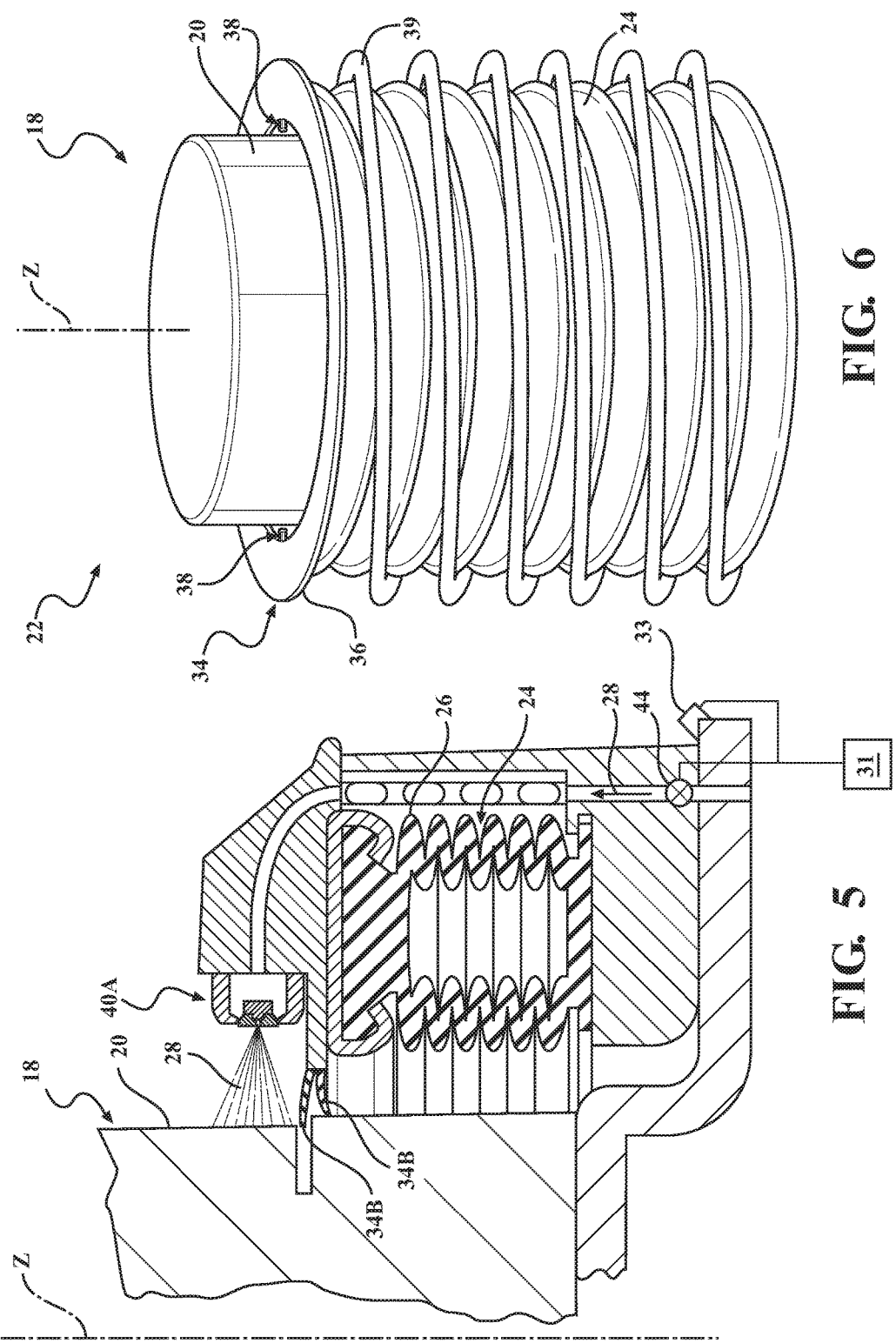

SELF-CENTERING WIPER SYSTEM FOR AN OPTICAL DEVICE

INTRODUCTION

The present disclosure relates to a self-centering wiper system for an annular optical device.

Generally, optical instruments or devices are generally used to either capture or transmit light waves. Optical devices may include one or more lenses configured to either focus or disperse a light beam by means of refraction. Lenses may be made from materials such as glass or plastic, and are either ground and polished or molded to a desired shape. Such a shape may be configured to focus light for forming an image, or to disperse waves of light or radiation.

Optical devices may additionally process captured light waves to enhance an image for viewing, or analyze light waves to determine their characteristic properties. Optical instruments generally rely on having a clean working surface for maintaining reliable and unimpeded emission or collection of light signals. When such optical devices are used in the open, i.e., surrounded by the ambient contaminants, such as dust, dirt, rain, etc., such contaminants may settle on the device's working surface and interfere with emission or collection of light signals.

SUMMARY

A self-centering wiper system for an optical device having a device body or housing defined by an outer surface with an annular-shaped cross-section disposed along an axis includes an annular-shaped bellows. The bellows is configured to fit externally and concentrically with respect to the outer surface of the optical device body. The bellows has at least one bladder configured to accept a pressurized fluid to thereby extend the annular-shaped bellows along the axis. The wiper system also includes an annular-shaped wiper element fixed to the annular-shaped bellows and configured to wipe contaminants off the outer surface of the optical device body as the at least one bladder accepts the pressurized fluid and the annular-shaped bellows expands along the axis.

The self-centering wiper system may also include a ring element fixed to the annular-shaped bellows. In such an embodiment, the annular-shaped wiper element may be fixed to the ring element.

The self-centering wiper system may additionally include a fluid delivery nozzle configured to spray fluid, such as air, water, etc., onto the outer surface of the optical device body. In a particular embodiment, the nozzle may be mounted either to the annular-shaped wiper or to the optical device body.

The bladder may include a plurality of closed fluid-cell columns spaced evenly apart from one another in the annular-shaped bellows, for example having three bladder columns spaced 120 degrees apart.

The optical device may be either a collector or an emitter of light.

The annular-shaped wiper element may define a plurality of apertures configured to emit the pressurized fluid onto the outer surface of the optical device body.

The annular-shaped wiper element may include an annular blade.

The annular-shaped wiper element may include a plurality of squeegee blades configured to wipe the contaminants off the outer surface of the optical device body.

The annular-shaped wiper element may define a hollow inner cell. In such an embodiment, the hollow inner cell may be in fluid communication with the at least one bladder.

Also disclosed is an optical device having such a self-centering wiper system.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 4A is an enlarged schematic partial cross-sectional illustration of another embodiment of the optical device and the self-centering wiper system shown in FIG. 2, with the annular-shaped wiper element defining a plurality of apertures for emitting a pressurized fluid, according to the present disclosure.

FIG. 4B is an enlarged schematic partial illustration of the annular-shaped wiper element shown in FIG. 4A, wherein the apertures have an oval shape, according to the present disclosure.

FIG. 5 is an enlarged schematic partial cross-sectional illustration of another embodiment of the optical device and the self-centering wiper system shown in FIG. 2, according to the present disclosure.

FIG. 6 is a schematic partial cross-sectional illustration of the optical device and the self-centering wiper system shown in FIG. 2, depicting a fluid line arranged in a helical pattern around the bellows, according to the present disclosure.

DETAILED DESCRIPTION

Figure 1:
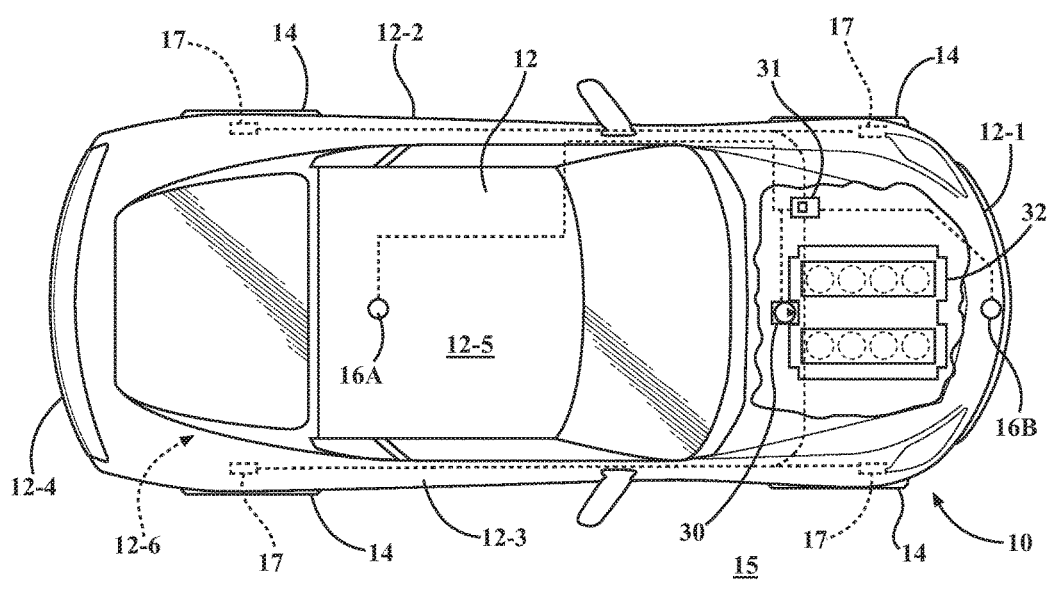
FIG. 1 is a plan view of a motor vehicle having an optical device mounted to the vehicle body, according to the present disclosure.

Referring to the drawings, wherein like reference numbers refer to like components, FIG. 1 shows a schematic view of a motor vehicle 10, which includes a vehicle body 12. As shown, the vehicle body 12 may have a leading side or front end 12-1, a left body side 12-2, right body side 12-3, a trailing side or back end 12-4, a top side or section, such as a roof, 12-5, and a bottom side or undercarriage 12-6. The vehicle 10 may include a plurality of road wheels 14. Although four wheels 14 are shown in FIG. 1, a vehicle with fewer or greater number of wheels, or having other means, such as tracks (not shown), of traversing a road surface 15 or other terrain is also envisioned.

FIG. 1 also depicts an optical device mounted to the vehicle body 12, with various embodiments of the subject optical device identified via numerals 16A and 16B. Specifically, such an optical device may be either an emitter 16A or a collector/receiver 16B of light. Either the emitter 16A or the receiver 16B embodiment of the optical device 16 may be mounted to any of the vehicle body sides 12-1, 12-2, 12-3, 12-4, 12-5, and 12-6. Specifically, as shown in FIG. 1, the optical device may be a laser beam source for a Light Detection and Ranging (LIDAR) system, and is specifically identified via numeral 16A. LIDAR is a surveying and remote sensing method that measures distance to a target by illuminating that target with a pulsed laser light, such as via the optical device described above, and measuring the reflected pulses with sensor(s) 17. Differences in laser return times and wavelengths can then be used to make digital 3D-representations of the target. LIDAR is commonly used to make high-resolution maps, with applications in various scientific disciplines, such as geomatics, geography, atmospheric physics, and laser guidance. The LIDAR technology is frequently also used for control and navigation of autonomous vehicles, such as the vehicle 10. The LIDAR typically splits the laser beam into a plurality of beams for detection of objects at various distances from the source. Such a split beam configuration permits the LIDAR to obtain a spatial detection and description of the environment. Accordingly, in the case of LIDAR, the optical device is an emitter 16A of light.

Other examples of the subject optical device may be a laser light sensor for an adaptive cruise control system (also shown in FIG. 1), which is specifically identified via numeral 16B. Adaptive cruise control is commonly used on motor vehicles, such as the vehicle 10, to automatically adjust the vehicle's speed to maintain a safe distance from vehicles operating ahead. Such systems may use a radar or laser sensor and/or a stereo camera setup to detect when the vehicle 10 approaches another vehicle operating ahead. The subject system's detection and generated signals permit the vehicle 10 to timely brake and then accelerate when traffic clears up or again starts to flow. Accordingly, in the case of adaptive cruise control, the optical device is a collector or receiver 16B of light.

In FIGS. 2-7, various embodiments of the optical device shown in FIG. 1 are generally identified via numeral 16, and will be referred to as such for the remainder of the present disclosure. The optical device 16 has a device body or housing 18 defined by an outer surface 20 and configured as an optically transparent lens. The housing 18 may be constructed from a tough material specifically formulated to permit transmission of light therethrough, for example glass or engineered plastic, such as polycarbonate. The outer surface 20 has an annular-shaped cross-section 20A, which may be cylindrical or conical, and thus having either a consistent or gradually variable, respectively, circumference $C_S$. The annular-shaped cross-section 20A of the outer surface 20 is disposed along an axis Z, which is depicted as a vertical axis in the exemplary embodiment. The device body 18 is intended to be a water-tight, i.e., hermetically-sealed component, especially along and across the outer surface 20, and thus configured to shield the inner components of the optical device 16 from contamination, indicated via letter "C" in FIGS. 3A and 3B, as a result of inclement weather and any road-borne debris. However, the effectiveness and accuracy of the optical device 16 may be compromised by such contamination being deposited on the outer surface 20.

Figure 2:
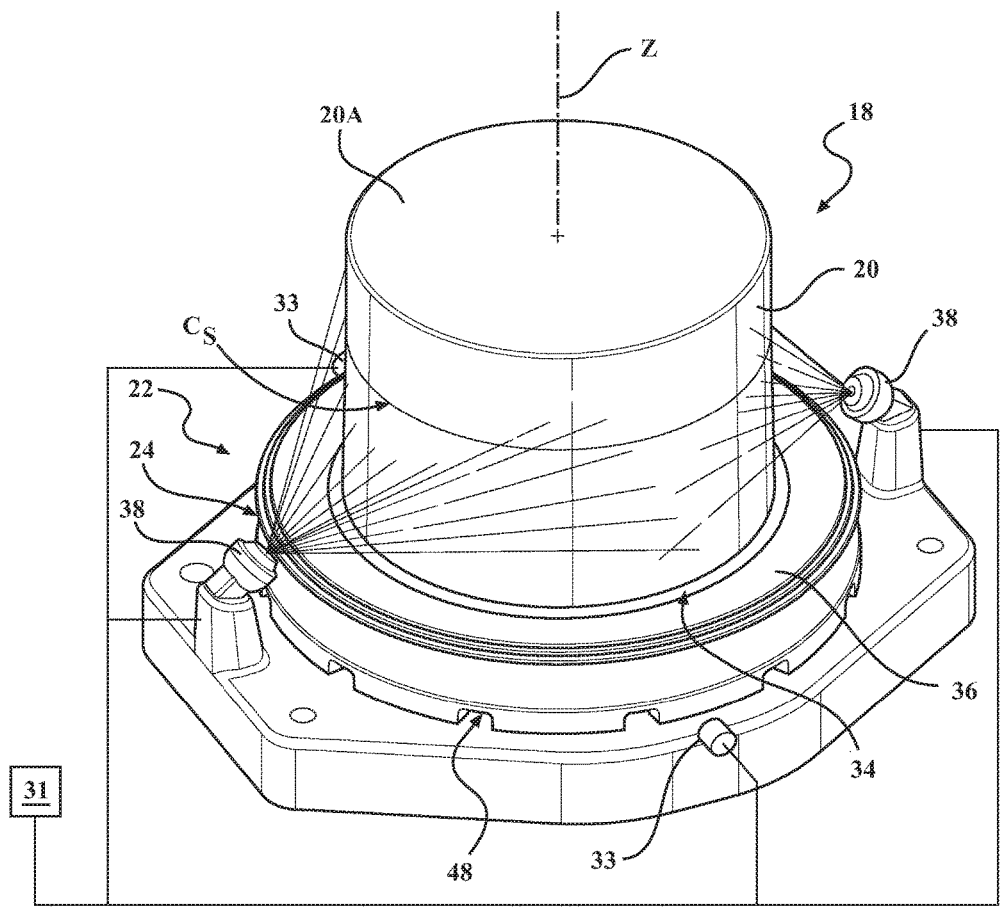
FIG. 2 is an enlarged schematic perspective view of a representative optical device shown in FIG. 1 and a self-centering wiper system having an annular-shaped inflating bellows and an annular-shaped wiper element, depicting the bellows in a retracted state, according to the present disclosure.
Figure 3A:
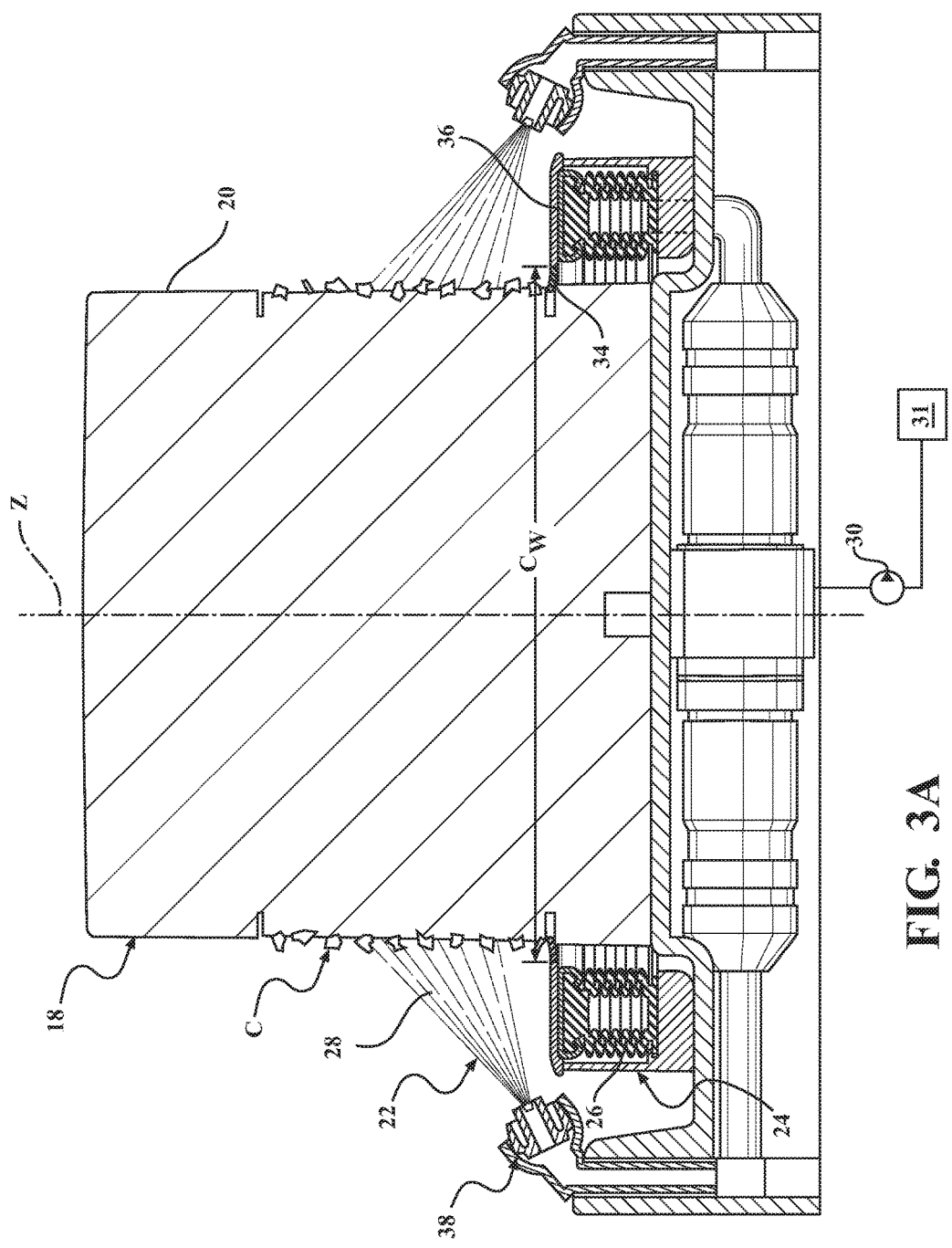
FIG. 3A is an enlarged schematic cross-sectional illustration of one embodiment of the optical device and the self-centering wiper system shown in FIG. 2, depicting the bellows in a retracted state, according to the present disclosure.
Figure 3B:
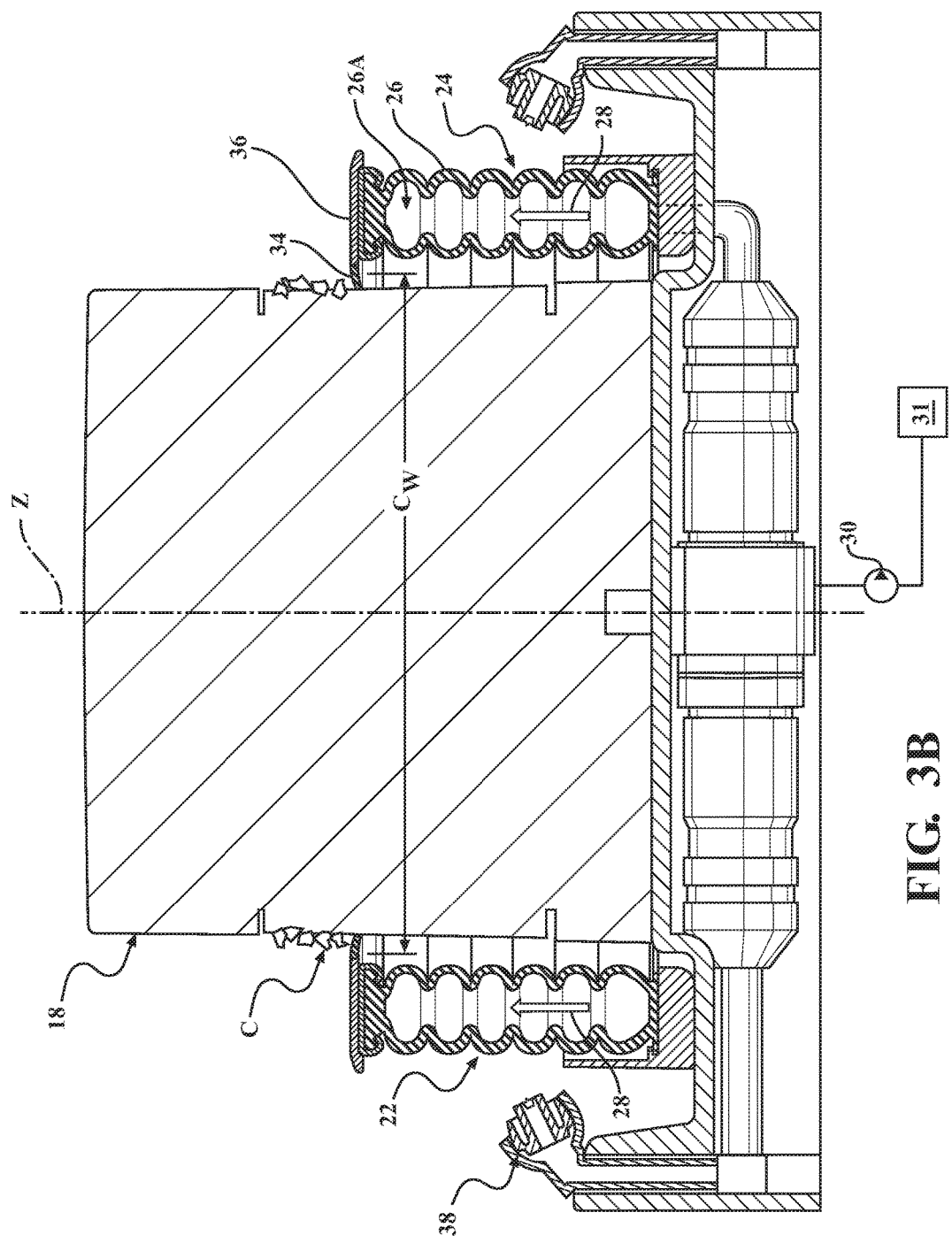
FIG. 3B is an enlarged schematic cross-sectional illustration the optical device and the self-centering wiper system shown in FIG. 3A, depicting the bellows in an expanded state, according to the present disclosure.
Figure 7:
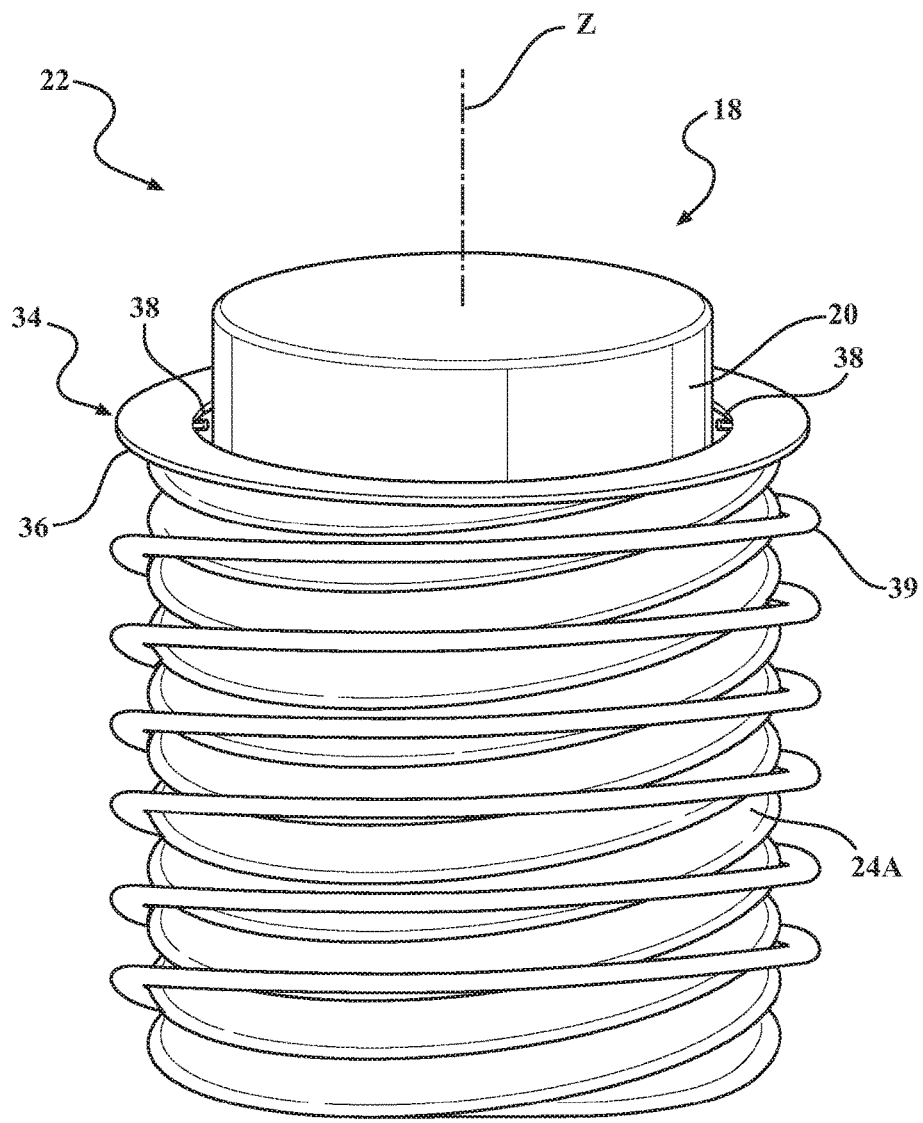
FIG. 7 is a schematic perspective illustration of the optical device and the self-centering wiper system shown in FIG. 2, depicting the bellows forming a helically expanding structure, according to the present disclosure.

As also shown in FIG. 2, for the purpose of removal of such contamination, the optical device 16 includes a self-centering wiper system 22. The self-centering wiper system 22 is specifically configured to wipe and clean the outer surface 20 of the optical device housing 18 from moisture, dirt, and other ambient and road-borne contamination. The wiper system 22 includes an annular-shaped bellows 24. The bellows 24 is configured to be disposed or fit externally and concentrically with respect to the outer surface 20 of the optical device housing 18. As shown in FIGS. 3A and 3B, the bellows 24 includes one or more either pneumatically or hydraulically inflatable bladders 26. Specifically, the bladder(s) 26 are configured to accept and become inflated by a pressurized fluid 28, such as air, water, coolant, etc.

The fluid 28 may be supplied by a fluid pump 30 arranged on the vehicle body 12 of the vehicle 10 (shown in FIG. 1). With continued reference to FIG. 1, the vehicle 10 also includes a controller 31, which may be an engine control unit (ECU), configured or programmed to regulate the operation of the engine 32 or a stand-alone electronic controller. The controller 31 includes a memory that is tangible and non-transitory. The memory may be a recordable medium that participates in providing computer-readable data or process instructions. Such a medium may take many forms, including but not limited to non-volatile media and volatile media.

Non-volatile media used by the controller 31 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 31 may also include a flexible disk, hard disk, magnetic tape, other magnetic medium, a CD-ROM, DVD, other optical medium, etc. The controller 31 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 31 or accessible thereby may be stored in the memory and automatically executed to provide the required functionality.

The controller 31 may be configured, i.e., structured and programmed, for regulating the fluid pump 30 to pressurize the fluid 28 and thereby activate the wiper system 22. The self-centering wiper system 22 may also include one or more sensors 33 to detect presence of dirt or contamination on the outer surface 20 of the optical device housing 18. The sensors 33 may be arranged proximate the wiper system 22 and trained on the outer surface 20 for effective detection of such contamination. The controller 31 may electronically interface with such sensor(s) 33 to determine an appropriate instance and duration of time for activating the fluid pump 30 to remove contamination from the outer surface 20 via the wiper system 22.

The wiper system 22 also includes an annular-shaped wiper element 34. The annular-shaped wiper element 34 is specifically configured as a self-centering radial wiper for the outer surface 20 of the optical device housing 18. The wiper element 34 may be configured as a washer or a squeegee. Accordingly, the wiper element 34 may be constructed from a suitably resilient and durable material, such as rubber, particularly for consistent and reliable squeegee function over the desired service life of the wiper system 22. The wiper element 34 is fixed to the annular-shaped bellows 24 and configured to wipe contaminants off the outer surface 20 of the optical device housing 18 as the bladder(s) 26 accept the pressurized fluid 28, the bladder(s) are inflated, and the bellows expands from a contracted or retracted state along the axis Z. Accordingly, the above-described inflation of the bladder(s) 26 by the fluid 28 results in extension of the annular-shaped wiper element 34 along the axis Z and traversal thereby of the outer surface 20 to thereby remove any contamination therefrom. The wiper system 22 may also include a ring element 36 fixed to the annular bellows 24. In such an embodiment, the annular-shaped wiper element 34 may be fixed to the ring element 36.

The self-centering wiper system 22 may also include a fluid delivery nozzle 38 configured to spray the fluid 28, such as air, water, coolant, etc., onto the outer surface 20 of the optical device housing 18. As shown, the nozzle 38 may be mounted either to the annular-shaped wiper element 34 to shift along with the bellows 24, or to the optical device housing 18 for a stationary arrangement relative to the outer surface 20. The fluid delivery nozzle 38 may be fed with pressurized fluid 28 via a fluid line or hose 39. For example, the fluid line 39 may be arranged in a helical pattern around the bellows 24, such that, as the bellows 24 selectively extends and retracts along the axis Z, the fluid line 39 follows the motion of the bellows (shown in FIG. 6). The wiper system 22 may include a plurality of such nozzles 38 to ensure thorough fluid 28 coverage of the outer surface 20. As shown in FIG. 3B, each of the inflatable bladder(s) 26 may include a plurality of closed fluid-cell columns 26A spaced evenly apart from one another in and around a circumference of the bellows 24. For example, each of the inflatable bladder(s) 26 may include three individual bladder columns spaced 120 degrees apart.

As shown in FIGS. 4A and 4B, the annular-shaped wiper element 34 may define a plurality of apertures 42 configured to emit the pressurized fluid 28 onto the outer surface 20 of the optical device housing 18. The apertures 42 may be strategically arranged on the wiper element 34 to facilitate continuous and uninterrupted coverage of the circumference $C_S$ of the optical device housing 18 outer surface 20 during the extension of the bellows 24 along the axis Z. Specifically, the apertures 42 may be spaced evenly apart around the circumference $C_W$ of the wiper element 34 and be shaped to ensure thorough coverage of the circumference $C_S$ of the outer surface 20. For example, the apertures 42 may be circular (shown in FIG. 4B). Alternatively, the apertures 42 may have an oblong or oval shape and be positioned such that the oblong shape's longer axis is arranged perpendicular to the axis Z (not shown).

As shown in FIG. 5, the apertures 42 may be arranged in individual vertical columns 42A along the axis Z, such that the subject columns may be selectively activated via the controller 31 to clean solely the contaminated areas of the outer surface 20. In such an embodiment, the self-centering wiper system 22 may also include one or more valves 44 regulated by the controller 31 for selective activation of individual columns 42A. Accordingly, the valves 44 may be actuated by the controller 31 in response to localized detection of contaminants on the outer surface 20 via the sensors 33. Furthermore, the self-centering wiper system 22 may be configured for two-stage operation. For example, the bladder(s) 26 may be configured to become inflated by a pressurized fluid 28 at a first pressure value, such as 90 Psi, and the nozzle(s) 38 and/or apertures 42 may be configured to deliver the pressurized fluid 28 onto the outer surface 20 of the optical device housing 18 at a second, relatively higher, pressure value, such as 100 Psi. In such an embodiment of the self-centering wiper system 22, valves (such as the valves 44) may be employed and selectively regulated by the controller 31 for activation of nozzles 38 and/or apertures 42.

The annular-shaped wiper element 34 may include a continuous, single piece annular blade 34A. Alternatively, the annular-shaped wiper element 34 may include a plurality of continuous, single piece annular blades 34A arranged in separate rows, one below the other along the axis Z, to ensure effective removal of contamination of the outer surface 20. In such an embodiment, at least some apertures 42 may be arranged between the individual rows of the annular blades 34A. Additionally, the annular-shaped wiper element 34 may define at least one hollow inner cell 46. The hollow inner cell(s) 46 may be in fluid communication with the at least one bladder 26. The hollow inner cell(s) 46 may be defined by the structure of the annular-shaped wiper element 34 and roll or rotate along the axis Z as the bellows expands along the axis Z. Additionally, the above-described annular-shaped wiper element 34 having a hollow inner cell 46 may include a plurality of individual squeegee blades 34B extending from a respective annular blade 34A. Such a plurality of squeegee blades 34B may be configured to wipe the contaminants off the outer surface 20 of the optical device body 18 in succession, i.e., one squeegee blade 34B after the other, as the hollow inner cell 46 rolls along the axis Z.

As shown in FIG. 2, the optical device housing 18 may define drainage passage(s) 48 configured to facilitate channeling and removal of the fluid 28 after the subject fluid was used to clean the outer surface 20 of the housing. In a separate embodiment shown in FIG. 7, the annular-shaped bellows 24 may be constructed to form a helically expanding bellows structure 24A. In other words, as the bladder(s) 26 are inflated by the pressurized fluid 28, the bellows structure 24A not only expands along the axis Z, but also turns relative to the axis Z. Such helical action of the bellows structure 24A may facilitate more thorough coverage of the outer surface 20 by the pressurized fluid 28 emitted through the apertures 42.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A self-centering wiper system for an optical device having an optical device body defined by an outer surface with an annular-shaped cross-section disposed along an axis, comprising:

an annular-shaped bellows configured to fit externally and concentrically with respect to the outer surface of the optical device body and having at least one bladder configured to accept a pressurized fluid to thereby extend the annular-shaped bellows along the axis; and an annular-shaped wiper element fixed to the annular-shaped bellows and configured to wipe contaminants off the outer surface of the optical device as the at least one bladder accepts the pressurized fluid and the annular-shaped bellows expands along the axis.

2. The self-centering wiper system according to claim 1, further comprising a ring element fixed to the annular-shaped bellows, and wherein the annular-shaped wiper element is fixed to the ring element.

3. The self-centering wiper system according to claim 1, further comprising a fluid delivery nozzle configured to spray fluid onto the outer surface of the optical device body.

4. The self-centering wiper system according to claim 1, wherein the at least one bladder includes a plurality of closed fluid-cell columns spaced evenly apart from one another in the annular-shaped bellows.

5. The self-centering wiper system according to claim 1, wherein the optical device is one of a collector and an emitter of light.

6. The self-centering wiper system according to claim 1, wherein the annular-shaped wiper element defines a plurality of apertures configured to emit the pressurized fluid onto the outer surface of the optical device body.

7. The self-centering wiper system according to claim 1, wherein the annular-shaped wiper element includes an annular blade.

8. The self-centering wiper system according to claim 1, wherein the annular-shaped wiper element includes a plurality of squeegee blades configured to wipe the contaminants off the outer surface of the optical device body.

9. The self-centering wiper system according to claim 1, wherein the annular-shaped wiper element defines a hollow inner cell.

10. The self-centering wiper system according to claim 9, wherein the hollow inner cell is in fluid communication with the at least one bladder.

11. An optical device, comprising:

an optical device body defined by an outer surface having an annular-shaped cross-section disposed along an axis; and a self-centering wiper system for an optical device including:

an annular-shaped bellows configured to fit externally and concentrically with respect to the outer surface of the optical device body and having at least one bladder configured to accept a pressurized fluid to thereby extend the annular-shaped bellows along the axis; and an annular-shaped wiper element fixed to the annular-shaped bellows and configured to wipe contaminants off the outer surface of the optical device body as the at least one bladder accepts the pressurized fluid and the annular-shaped bellows expands along the axis.

12. The optical device according to claim 11, wherein the self-centering wiper system further includes a ring element fixed to the annular-shaped bellows, and wherein the annular-shaped wiper element is fixed to the ring element.

13. The optical device according to claim 11, wherein the self-centering wiper system further includes a fluid delivery nozzle configured to spray fluid onto the outer surface of the optical device body.

14. The optical device according to claim 11, wherein the at least one bladder includes a plurality of closed fluid-cell columns spaced evenly apart from one another in the annular-shaped bellows.

15. The optical device according to claim 11, wherein the optical device is one of a collector and an emitter of light.

16. The optical device according to claim 11, wherein the annular-shaped wiper element defines a plurality of apertures configured to emit the pressurized fluid onto the outer surface of the optical device body.

17. The optical device according to claim 11, wherein the annular-shaped wiper element includes an annular blade.

18. The optical device according to claim 11, wherein the annular-shaped wiper element includes a plurality of squeegee blades configured to wipe the contaminants off the outer surface of the optical device body.

19. The optical device according to claim 11, wherein the annular-shaped wiper element defines a hollow inner cell.

20. The optical device according to claim 19, wherein the hollow inner cell is in fluid communication with the at least one bladder.

* * * * *